(12) United States Patent
Bolen et al.

(10) Patent No.: US 11,720,517 B2
(45) Date of Patent: Aug. 8, 2023

(54) INFORMATION HANDLING SYSTEM BUS OUT OF BAND MESSAGE ACCESS CONTROL

(71) Applicant: Dell Products, L.P., Round Rock, TX (US)

(72) Inventors: Austin P. Bolen, Austin, TX (US); Chandrashekar Nelogal, Round Rock, TX (US); Kevin Thomas Marks, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 4 days.

(21) Appl. No.: 17/511,163

(22) Filed: Oct. 26, 2021

(65) Prior Publication Data

US 2023/0126468 A1 Apr. 27, 2023

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC .............. G06F 13/4221; G06F 2213/0026
See application file for complete search history.

(56) References Cited

U.S. PATENT DOCUMENTS

| 2012/0047309 | A1* | 2/2012 | Natu | G06F 13/4027 |
| | | | | 710/314 |
| 2018/0183758 | A1* | 6/2018 | Itkin | H04L 63/20 |
| 2020/0169560 | A1* | 5/2020 | Arora | H04L 9/3247 |
| 2021/0288923 | A1* | 9/2021 | Subbiah | H04L 63/101 |

* cited by examiner

*Primary Examiner* — Glenn A. Auve
(74) *Attorney, Agent, or Firm* — Fogarty LLP

(57) ABSTRACT

An information handling system bus port above a subject information handling system bus device may host an information handling system bus out of band message access control list of information handling system bus target device identifiers of other information handling system bus connected devices that the subject device is permitted to communicate with. The port may compare an information handling system bus target device identification field in out of band messages from the subject device to the list and route only out of band messages from the subject device in which the target device identification in the target device identification field is on the access control list through the information handling system bus. The port may discard (and generate error notifications, statuses, etc.) for out of band messages in which the target device identification in the target device identification field is not on the access control list.

20 Claims, 4 Drawing Sheets

INFORMATION HANDLING SYSTEM BUS OUT OF BAND MESSAGE ACCESS CONTROL

FIELD

This disclosure relates generally to information handling systems, more specifically to information handling system bus out of band message access control, and particularly to embodiments thereof for Peripheral Component Interconnect Express (PCIe®) Vendor Defined Message (VDM) access control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments of information handling system bus (e.g., PCIe®) out of band message (e.g., VDM) access control are described. In an illustrative, non-limiting example for information handling system bus out of band message access control, an information handling system bus out of band message access control list may be created. The access control list may be a list of information handling system bus target device identifiers (IDs) of other information handling system bus connected devices that a subject information handling system bus connected device is permitted to communicate with. The access control list may be hosted in a port above the subject information handling system bus device. This port above the subject information handling system bus device may be a root port, switch downstream port, or the like.

The port above the subject information handling system bus device, or the like, may compare an information handling system bus target device identification field in information handling system bus out of band messages from the subject information handling system bus device to the access control list. The port above the subject information handling system bus device, or the like, may route each information handling system bus out of band message from the subject information handling system bus device, in which the information handling system bus target device identification in the information handling system bus target device identification field is on the access control list through the information handling system bus.

Conversely, the port above the subject information handling system bus device, or the like, may discard each information handling system bus out of band message from the subject information handling system bus device, in which the information handling system bus target device identification in the information handling system bus target device identification field is not on the access control list. An error notification, an error status, and/or the like, may be generated by the port above the subject information handling system bus device, or the like, in response to the discarding of an information handling system bus out of band message.

In some implementations, the information handling system bus out of band messages access control list may include an information handling system bus target device ID of an information handling system Baseboard Management Controller (BMC) and no other information handling system bus target device IDs. Alternatively, the information handling system bus out of band messages access control list may include not only an information handling system bus target device ID of an information handling system BMC, but also at least one other information handling system bus target device ID. The information handling system bus out of band message access control list may be write protected. For example, the information handling system bus out of band message access control list may be created in write-once registers of the port, the information handling system bus out of band message access control list may be authenticated, such as by the port, with an information handling system BMC prior to altering the information handling system bus out of band message access control list, or the like.

In some implementations, the information handling system bus out of band message access control list may initially be is empty, and the list may be populated by authenticating the information handling system bus connected device and updating the information handling system bus out of band message access control list to include an information handling system BMC. This authentication of the information handling system bus connected device may be carried out via an interface of another information handling system bus, such as a system management bus interface, or the like. The information handling system bus out of band message access control list may also, in such implementations be updated to include at least one other information handling system bus connected device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
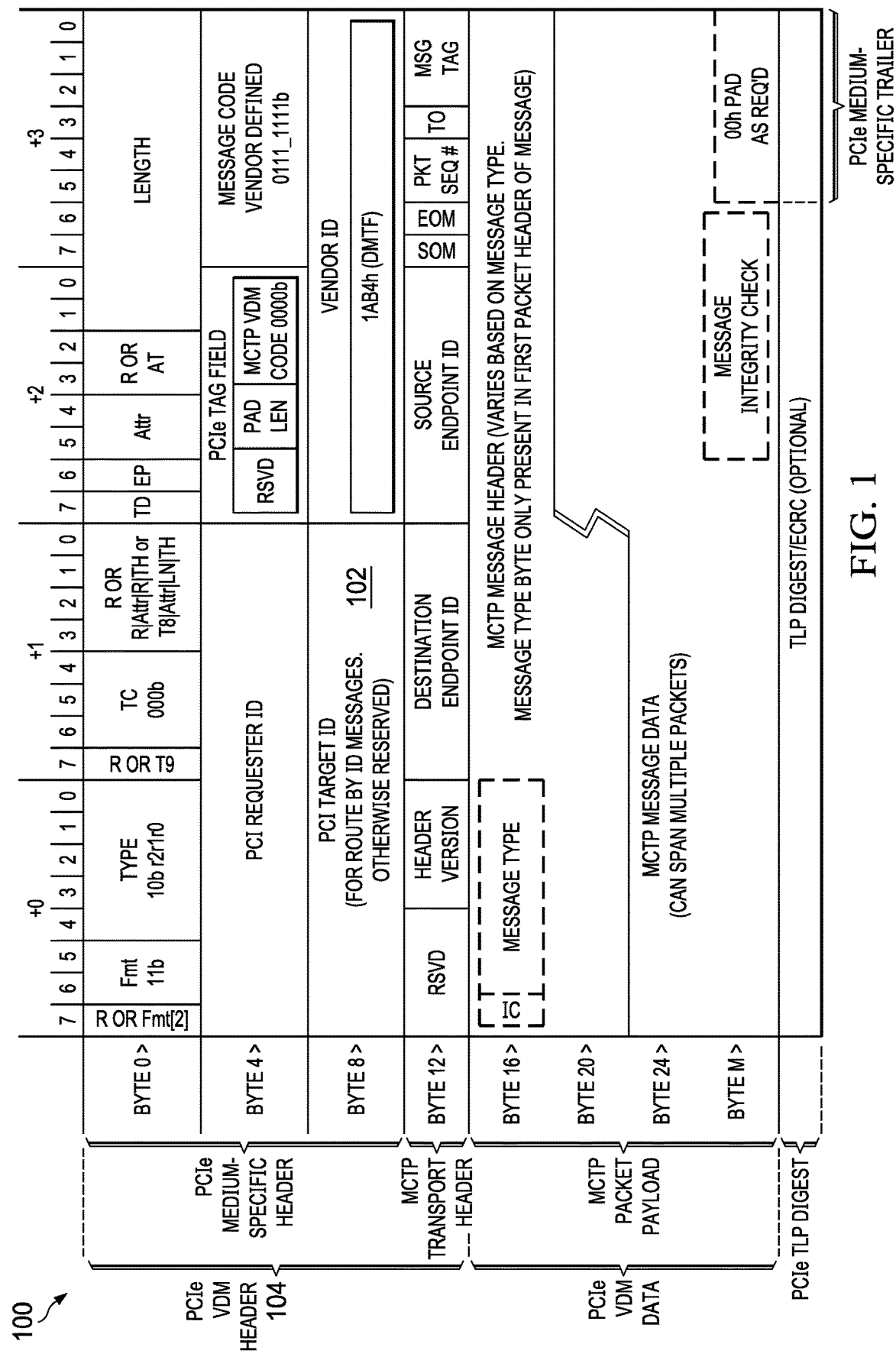
FIG. 1 is a diagram of the format of an example Peripheral Component Interconnect Express (PCIe®) Vendor Defined Message (VDM) packet.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. A more detailed example of an information handling system (server) is described below, with respect to FIG. 4.

In the Peripheral Component Interconnect Express (PCIe®) information handling system bus standards, there are access control mechanisms for memory and Input/Output (I/O) operations used for communication between an in-band host Operating System (OS) and an endpoint device or peer-to-peer between two endpoint devices. However, Baseboard Management Controllers (BMCs) use out-of-band mechanisms, such as Management Component Transport Protocol (MCTP), to communicate with devices using out of band messages, such as over PCIe® Vendor Defined Messages (VDMs). MCTP may be used for out-of-band management from a BMC. PCIe® VDMs may be used in such implementations, particularly for high-bandwidth operations like updating component firmware and reading large debug logs. Such implementations may be employed for general purpose servers, storage systems, hyperscale computing, cloud computing, etc.

However, there are no access control mechanisms defined by the PCIe® standards that a platform can use to control PCIe® VDMs. Out-of-band device management during system operation may employ MCTP PCIe® VDMs for device health monitoring, power and/or thermal management, firmware updates, device configuration, and/or the like. However, PCIe® VDMs can also perform operations, such as erase Non-Volatile Memory Express (NVMe) drives in a system, or the like. Therefore, a rogue PCIe® device could send PCIe® VDMs, peer-to-peer, to another PCIe® device to perform malicious actions such as erasing an NVMe drive, clearing the configuration of a RAID controller, taking ownership of Trusted Computing Group (TCG) Security Subsystem Class (SSC) compliant NVMe drive (e.g., a TCG Opal compliant NVMe drive), etc.

Embodiments of the present systems and methods provide information handling system bus out of band message access control, such as PCIe® VDM access control. In particular, embodiments of the present systems and methods leverage an information handling system bus (e.g., PCIe®) out of band message (e.g., VDM) target identification to provide information handling system bus out of band message (e.g., PCIe® VDM) access control.

FIG. 1 is a diagram of the format of PCIe® VDM packet 100. PCI Target ID field 102 of PCIe® VDM packet header 104 is typically used to route PCIe® VDMs through the PCIe® fabric of an information handling system, or the like, from a requester device to a target device. PCI Target ID 102 of PCIe® VDM packet header 104 is typically a 16-bit Bus, Device or Function identification of a Bus, Device or Function to route the PCIe® VDM to. A MCTP PCIe® VDM may be made up of one or more of PCIe® VDM packets 100. Embodiments of the present systems and methods leverage PCIe® VDM PCI Target ID field 102 to provide information handling system bus out of band message (PCIe® VDM) access control.

Figure 2:
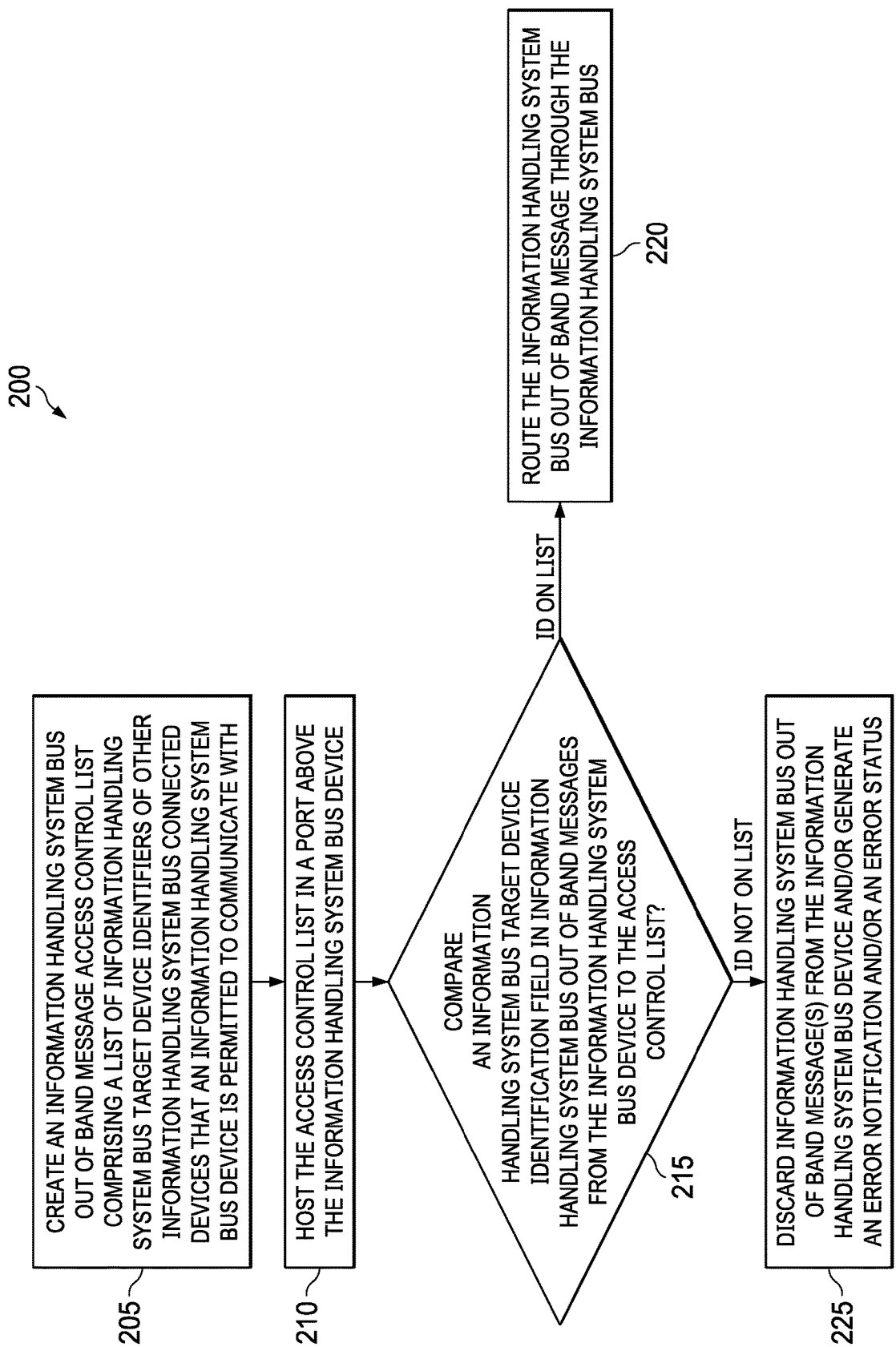
FIG. 2 is a flowchart of example information handling system bus (e.g., PCIe®) out of band message (e.g., VDM) access control, according to some embodiments.
Figure 3:
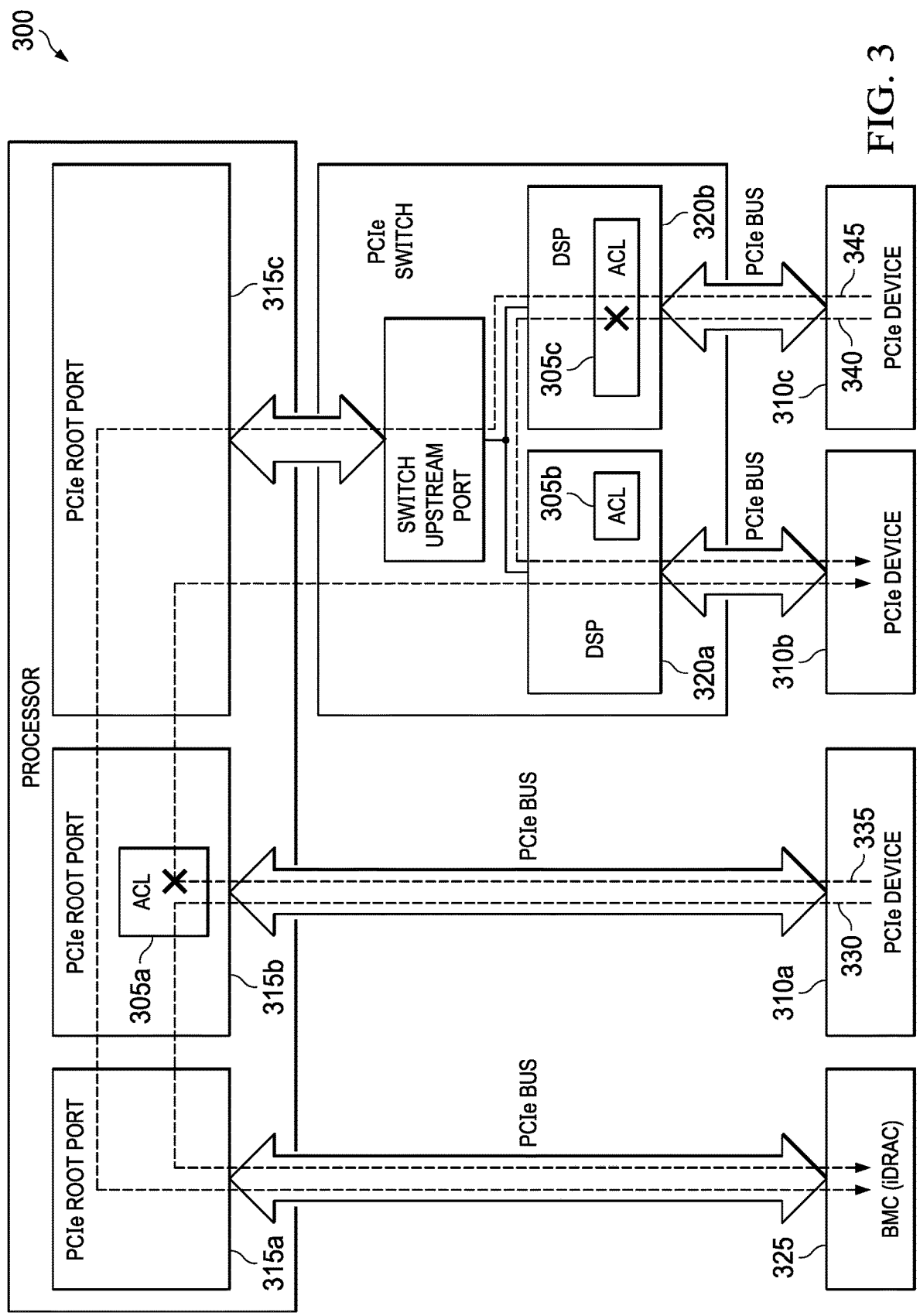
FIG. 3 is a diagram of example PCIe® VDM access control, according to some embodiments.

FIG. 2 is a flowchart of example method 200 for information handling system bus (e.g., PCIe®) out of band message (e.g., VDM) access control, according to some embodiments, which will be described herein in conjunction with FIG. 3, which is a diagram of example PCIe® VDM access control 300, according to some such embodiments (and in conjunction with FIG. 1).

At 205, an information handling system bus out of band message Access Control List (ACL 305a through c) may be created, in accordance with embodiments of the present systems and methods. ACL 305 is configured to be applied to information handling system bus out of band messages from an information handling system bus connected device 310 (i.e., one of 310a through c), for example, an ACL for PCIe® VDMs. In accordance with embodiments of the present systems and methods, ACL 305 is a list of information handling system bus target device identifiers (e.g., PCI Target IDs 102) of other information handling system bus connected (e.g., PCIe®) devices that subject information handling system bus connected device 310 is permitted to communicate with. Such another information handling system bus target device that subject information handling system bus connected device 310 is permitted to communicate with may be an information handling system bus target device that the subject information handling system bus connected device is permitted to send out of band messages (e.g., VDM message packets 100) to.

As noted, PCI Target ID field 102, or the like, in a PCIe® VDM is used, in accordance with embodiments of the present systems and methods, to route PCIe® VDMs through the PCIe® fabric from the requesting device to the target device. To such ends, ACL 305 may be hosted in a port above the subject information handling system bus device, as indicated at 210. That is, in accordance with embodiments of the present systems and methods, ACL 305 resides in each port, (e.g., Root Port(s) (RP) 315a through c) or Switch Downstream Port (DSP) 320a or b) above each PCIe® device 310. Resultingly, each ACL consists of a list of PCI Target IDs, or the like, that the device below the RP or DSP is permitted to communicate with (i.e., send VDM packets to).

At 215, port 315 or 320 above the information handling system bus device 310 compares information handling system bus target device identification field 102 in information handling system bus out of band messages from the information handling system bus device to ACL 305. For example, when an RP (315) or a DSP (320) hosting an ACL (305) in accordance with embodiments of the present systems and methods receives a PCIe® VDM from a device connected to it, the RP or DSP compares PCI Target ID 102 in the PCIe® VDM to the list of allowable ones in the ACL.

At 220, port 315 or 320 above subject information handling system bus device 310 will route each information handling system bus out of band message from the subject information handling system bus device, in which the information handling system bus target device identification in the information handling system bus target device identification field is on the ACL (305) hosted in the port above the information handling system bus device, through the information handling system bus. That is, if allowed, the PCIe® VDM, for example, is passed on to the target device.

However, at 225, port 315 or 320 above subject information handling system bus device 310 may discard each information handling system bus out of band message from the information handling system bus device, in response to the information handling system bus target device identification in the information handling system bus target device identification field not being on the access control list (305) hosted in the port above the information handling system bus device. Thereby, RPs 315 and/or DSPs 320 provide PCIe® VDM access control via ACL 305, a list of allowed PCI Target IDs 105. Additionally, or alternatively, at 225, or the like, port 315 or 320 above the subject information handling system bus device may generate an error notification and/or error status, in response to the discarding of the information handling system bus out of band message from the information handling system bus device in which the information handling system bus target device identification in the information handling system bus target device identification field is not on the ACL (305) hosted in the port above the information handling system bus device. As a result, if not allowed (i.e., PCI Target ID 102 in the PCIe® VDM is not on ACL 305 of allowable PCI Target IDs), the PCIe® VDM is discarded at 225, and/or an error notification, and/or error status, may be generated, at 225. Such an error notification may be sent to firmware (e.g., to BIOS of the information handling system running on a CPU of the information handling system), sent to the BMC of the information handling system, to software running on the information handling system, or the like.

In accordance with the foregoing, for each information handling system bus out of band message (e.g., PCIe® VDM), the RP (315) or DSP (320) above a subject device (310) that initiated the PCIe® VDM will compare the PCI Target ID in the message to the allowable ones in the ACL. Allowed ones are passed to the specified target. All others are discarded with appropriate error notifications/status.

Under some embodiments of the present systems and methods, ACL 305 above each endpoint device 310 may normally be programmed to only allow the subject device to be able to communicate to information handling system BMC 325 so that the subject device cannot inject malicious PCIe® VDMs, or the like, to peer devices. FIG. 3 illustrates such an implementation. In such implementations, information handling system bus out of band message ACL 305 may only list the information handling system bus target device identifier of an information handling system BMC 325 and no other information handling system bus target device identifiers. Thus, with attention directed to FIG. 3, PCIe® VDM 330 from device 310*a* to BMC 325 is allowed to pass by ACL 305*a*, while VDM 335 from device 310*a* to device 310*b* is blocked by ACL 305*a*. Likewise, PCIe® VDM 340 from device 310*c* to device 310*b* is blocked by ACL 305*c*, while VDM 345 from device 310*c* to BMC 325 is allowed to pass by ACL 305*c*.

However, if PCIe® VDMs are to be sent to a peer device of subject device 310, the PCI Target IDs of any approved devices can be added to ACL 305, in accordance with embodiments of the present systems and methods. For example, in such implementations, information handling system bus out of band message ACL 305 may list (an) information handling system bus target device identifier(s) 102 of, not only the information handling system BMC 325, but also at least one other information handling system bus target device identifier. However, ACL 305 can, in accordance with various implementations, be (selectively) set to allow all PCIe® VDM traffic. This can, for example, be used to allow port 315*a* above BMC 325, and hence BMC 325, to communicate with any device 310*a* through *c* in the system.

Further, ACL 305 (whether it includes PCI Target IDs, or not) can, in accordance with embodiments of the present systems and methods, be write protected to avoid tampering and/or alteration. This may be carried out via write-once registers, which BMC 325 may authenticate to RP 315 or DSP 320 before alterations are permitted, or the like, in accordance with embodiments of the present systems and methods. For example, write protecting information handling system bus out of band message ACL 305 may include creating the information handling system bus out of band message ACL in write-once registers of port 315 or 320 above subject device 310. Further or alternatively, write protecting information handling system bus out of band message ACL 305 may call for authenticating, by port 315 or 320 above subject device 310, with information handling system BMC 325, prior to altering the information handling system bus out of band message ACL.

Additionally, or alternatively, embodiments of the present systems and methods can be used to restrict PCIe® VDM traffic until a device is authenticated and measured (e.g., device firmware has been validated as not tampered with). For example, ACL 305 may be programmed to block all PCIe® VDM traffic from device 310 until it has been authenticated via another interface (e.g., System Management Bus (SM Bus), or the like). Once device 310 has been authenticated, ACL 305 may, in accordance with embodiments of the present systems and methods, be updated to allow device 310 to send PCIe® VDMs to BMC 325 (and peer devices). To such ends, in such embodiments, information handling system bus out of band message ACL 305 may initially be empty. Information handling system bus connected device 310 may then be authenticated. Information handling system bus out of band message ACL 305 may then, as a result of such authentication, be updated to include at least information handling system's BMC 325 ID, and potentially other any (an)other information handling system bus connected device(s) ID(s).

Figure 4:
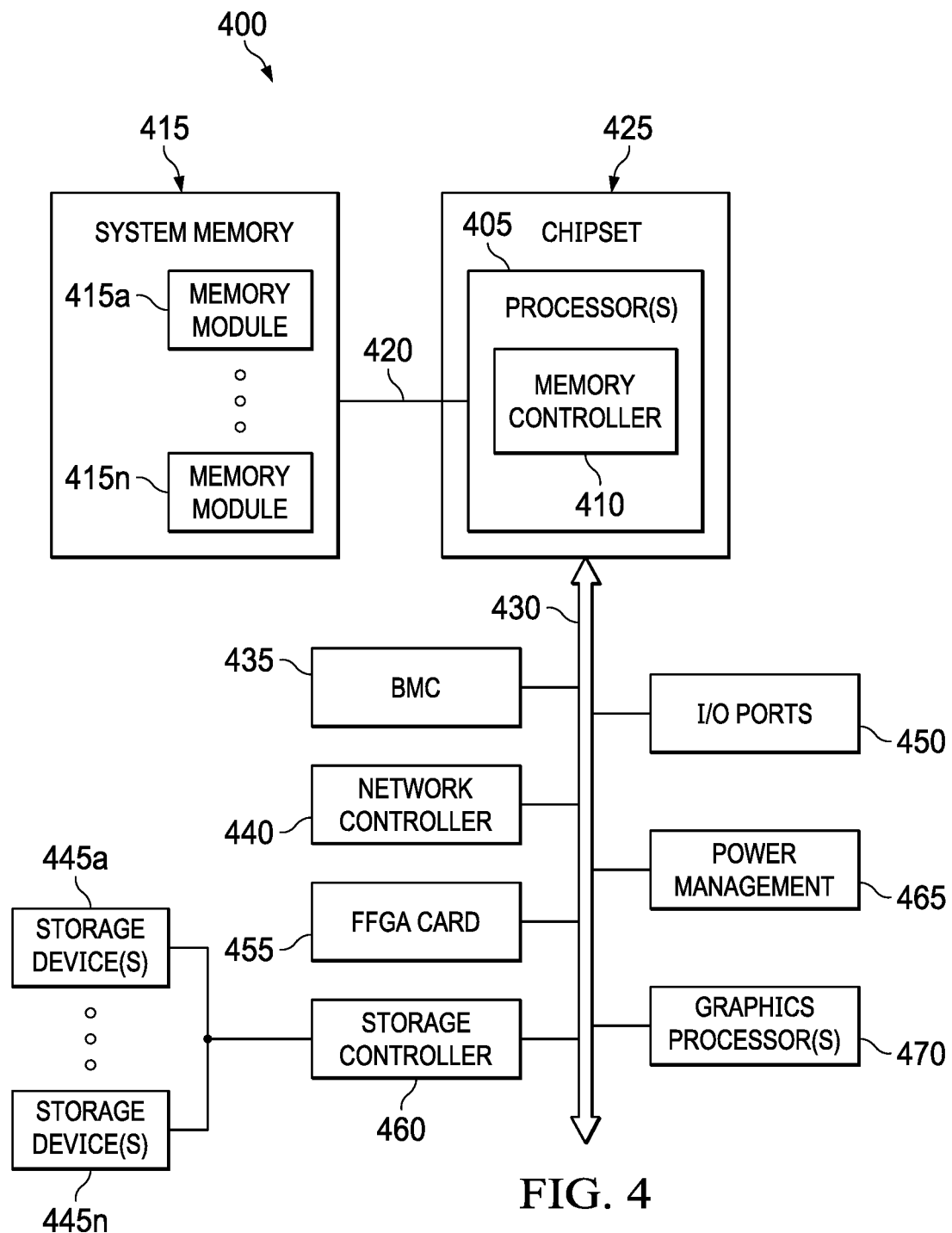
FIG. 4 is a block diagram illustrating components of an example of an information handling system, according to some embodiments.

FIG. 4 is a block diagram illustrating components of example information handling system 400. Information handling system 400 may utilize one or more processors 405. In some embodiments, processors 405 may include a main processor and a co-processor, each of which may include a plurality of processing cores that, in certain scenarios, may each be used to run an instance of a server process. In certain embodiments, one or all of processor(s) 405 may be graphics processing units (GPUs) in scenarios where information handling system 400 has been configured to support functions such as multimedia services and graphics applications.

As illustrated, processor(s) 405 includes an integrated memory controller 410 that may be implemented directly within the circuitry of the processor 405, or the memory controller 410 may be a separate integrated circuit that is located on the same die as the processor 405. The memory controller 410 may be configured to manage the transfer of data to and from the system memory 415 of the information handling system 405 via a high-speed memory interface 420. The system memory 415 is coupled to processor(s) 405 via a memory bus 420 that provides the processor(s) 405 with high-speed memory used in the execution of computer program instructions by the processor(s) 405. Accordingly, system memory 415 may include memory components, such as static RAM (SRAM), dynamic RAM (DRAM), NAND Flash memory, suitable for supporting high-speed memory operations by the processor(s) 405. In certain embodiments, system memory 415 may combine both persistent, non-volatile memory and volatile memory.

In certain embodiments, the system memory 415 may be comprised of multiple removable memory modules. The system memory 415 of the illustrated embodiment includes removable memory modules 415a-n. Each of the removable memory modules 415a-n may correspond to a printed circuit board memory socket that receives a removable memory module 415a-n, such as a DIMM (Dual In-line Memory Module), that can be coupled to the socket and then decoupled from the socket as needed, such as to upgrade memory capabilities or to replace faulty memory modules. Other embodiments of information handling system memory 415 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

Information handling system 400 may utilize chipset 425 that may be implemented by integrated circuits that are coupled to processor(s) 405. In this embodiment, processor(s) 405 is depicted as a component of chipset 425. In other embodiments, all of chipset 425, or portions of chipset 425 may be implemented directly within the integrated circuitry of processor(s) 405. The chipset may provide the processor(s) 405 with access to a variety of resources accessible via one or more buses 430. Various embodiments may utilize any number of buses to provide the illustrated pathways served by bus 430. In certain embodiments, bus 430 may include a PCIe® switch fabric that is accessed via a PCIe® root complex.

As illustrated, information handling system 400 includes BMC 435 to provide capabilities for remote monitoring and management of various aspects of information handling system 400. In support of these operations, BMC 435 may utilize both in-band, sideband and/or out of band communications with certain managed components of information handling system 400, such as, for example, processor(s) 405, system memory 415, chipset 425, network controller 435, storage device(s) 445, etc. BMC 435 may be installed on the motherboard of information handling system 400 or may be coupled to information handling system 400 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 435 may include non-volatile memory having program instructions stored thereon that are usable by CPU(s) 405 to enable remote management of information handling system 400. For example, BMC 435 may enable a user to discover, configure, and manage BMC 435, setup configuration options, resolve and administer hardware or software problems, etc. Additionally, or alternatively, BMC 435 may include one or more firmware volumes, each volume having one or more firmware files used by the BIOS' firmware interface to initialize and test components of information handling system 400.

In accordance with embodiments of the present systems and methods, host firmware, such as BIOS, BMC 435/325, or the like, may set up ACLs 305 above PCIe® Devices 310 to permit them to send PCIe® VDMs to certain devices only. For example, in the above-described example of FIG. 3 ACLs 305 above PCIe® Devices 310 only permit PCIe® VDMs to be sent to BMC 325. The host firmware may also set up ACLs above the BMC to permit it the BMC device to send PCIe® VDM traffic to any device. Also, host firmware, such as BIOS, BMC 435/325 may write protect ACL 305 in each RP 315 and/or DSP 320 prevent alteration, such as described above.

Information handling system 400 may also include the one or more I/O ports 450, such as USB ports, PCIe® ports, TPM (Trusted Platform Module) connection ports, HDMI ports, audio ports, docking ports, network ports, Fibre Channel ports and other storage device ports. Such I/O ports 450 may be externally accessible or may be internal ports that are accessed by opening the enclosure of the information handling system 400. Through couplings made to these I/O ports 450, users may couple the information handling system 400 directly to other information handling systems, storage resources, external networks and a vast variety of peripheral components.

As illustrated, information handling system 400 may include one or more FPGA (Field-Programmable Gate Array) cards 455. Each of the FPGA card 455 supported by information handling system 400 may include various processing and memory resources, in addition to an FPGA logic unit that may include circuits that can be reconfigured after deployment of information handling system 400 through programming functions supported by the FPGA card 455. Through such reprogramming of such logic units, each individual FGPA card 455 may be optimized to perform specific processing tasks, such as specific signal processing, security, data mining, and artificial intelligence functions, and/or to support specific hardware coupled to information handling system 400. In some embodiments, a single FPGA card 455 may include multiple FPGA logic units, each of which may be separately programmed to implement different computing operations, such as in computing different operations that are being offloaded from processor 405.

Information handling system 400 may include one or more storage controllers 460 that may be utilized to access storage devices 445a-n that are accessible via the chassis in which information handling system 100 is installed. Storage controller 460 may provide support for RAID (Redundant Array of Independent Disks) configurations of logical and physical storage devices 445a-n. In some embodiments, storage controller 460 may be an HBA (Host Bus Adapter) that provides more limited capabilities in accessing physical storage devices 445a-n. In some embodiments, storage devices 445a-n may be replaceable, hot-swappable storage devices that are installed within bays provided by the chassis in which information handling system 400 is installed. In embodiments where storage devices 445a-n are hot-swappable devices that are received by bays of chassis, the storage devices 445a-n may be coupled to information handling system 400 via couplings between the bays of the chassis and a midplane of information handling system 400. In some embodiments, storage devices 445a-n may also be accessed by other information handling systems that are also installed within the same chassis as information handling system 400. Storage devices 445a-n may include SAS (Serial Attached SCSI) magnetic disk drives, SATA (Serial Advanced Technology Attachment) magnetic disk drives, solid-state drives (SSDs) and other types of storage devices in various combinations.

Processor(s) 405 may also be coupled to a network controller 435 via bus 430, such as provided by a Network Interface Controller (NIC) that allows the information handling system 400 to communicate via an external network, such as the Internet or a LAN. In some embodiments, network controller 435 may be a replaceable expansion card or adapter that is coupled to a motherboard connector of information handling system 400. In some embodiments, network controller 435 may be an integrated component of information handling system 400.

A variety of additional components may be coupled to processor(s) 405 via bus 430. For instance, processor(s) 405 may also be coupled to a power management unit 465 that may interface with a power supply of information handling system 400. In certain embodiments, a graphics processor 470 may be comprised within one or more video or graphics cards, or an embedded controller, installed as components of the information handling system 400.

In certain embodiments, information handling system 400 may operate using a BIOS (Basic Input/Output System) that may be stored in a non-volatile memory accessible by the processor(s) 405. The BIOS may provide an abstraction layer by which the operating system of the information handling system 400 interfaces with the hardware components of the information handling system. Upon powering or restarting information handling system 400, processor(s) 405 may utilize BIOS instructions to initialize and test hardware components coupled to the information handling system, including both components permanently installed as components of the motherboard of information handling system 400 and removable components installed within various expansion slots supported by the information handling system 400. The BIOS instructions may also load an operating system for use by the information handling system 400. In certain embodiments, information handling system 400 may utilize Unified Extensible Firmware Interface (UEFI) in addition to or instead of a BIOS. In certain embodiments, the functions provided by a BIOS may be implemented, in full or in part, by the remote access controller 460. In some embodiments, BIOS may be configured to identify hardware components that are detected as being currently installed in information handling system 400. In such instances, the BIOS may support queries that provide the described unique identifiers that have been associated with each of these detected hardware components by their respective manufacturers. In providing an abstraction layer by which hardware of information handling system 400 is accessed by an operating system, BIOS may identify the I/O ports 450 that are recognized and available for use. As described in additional detail below, embodiments may utilize an inventory certificate that is stored to the information handling system during factory provisioning and that specifies the factory-provisioned I/O ports 450 of information handling system 400. Embodiments may utilize such an inventory certificate during a pre-boot initialization of information handling system 400 in order to enable, such as through BIOS configurations, only these factory-provisioned I/O ports 450 of information handling system 400.

In some embodiments, information handling system 400 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In information handling system embodiments that include a TPM, a pre-boot process implemented by the TPM may utilize its cryptographic capabilities to calculate hash values that are based on software and/or firmware instructions utilized by certain core components of information handling system, such as the BIOS and boot loader of information handling system 400. These calculated hash values may then be compared against reference hash values that were previously stored in a secure non-volatile memory of the information handling system, such as during factory provisioning of information handling system 400. In this manner, a TPM may establish a root of trust that includes core components of information handling system 400 that are validated as operating using instructions that originate from a trusted source.

In various embodiments, an information handling system 400 does not include each of the components shown in FIG. 4. In various embodiments, an information handling system 400 may include various additional components in addition to those that are shown in FIG. 4. Furthermore, some components that are represented as separate components in FIG. 4 may in certain embodiments instead be integrated with other components. For example, in certain embodiments, all or a portion of the functionality provided by the illustrated components may instead be provided by components integrated into the one or more processor(s) 405 as a systems-on-a-chip.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that information handling system 400 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available. For example, in some implementations, one or more of the devices or components shown in FIG. 4 may be absent, one or more other components may be added and/or one or more of the devices or components shown in FIG. 4 may be at least partially incorporated into CPU(s) 405. Accordingly, systems and methods described herein may be implemented or executed with other computer system configurations.

A person of ordinary skill will recognize that information handling system 400 of FIG. 4 is only one example of a system in which the certain embodiments may be utilized. Indeed, the embodiments described herein may be used in various types of an information handling systems such as a personal computer (e.g., desktop or laptop), tablet computer, mobile device (e.g., PDA or smart phone), server (e.g., blade server or rack server), a network storage device, or any other suitable device electronic devices, such as network router devices, televisions, custom telecommunications equipment for special purpose use, etc. That is, certain techniques described herein are in no way limited to use with the information handling system of FIG. 4.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for information handling system bus out of band message access control comprising:
   creating an information handling system bus out of band message access control list, the access control list comprising a list of information handling system bus target device identifiers of other information handling system bus connected devices that an information handling system bus connected device is permitted to communicate with;
   hosting the access control list in a port above the information handling system bus device;
   comparing, by the port above the information handling system bus device, an information handling system bus target device identification field in information handling system bus out of band messages from the information handling system bus device to the access control list; and
   routing, by the port above the information handling system bus device, each information handling system bus out of band message from the information handling system bus device, in which the information handling system bus target device identification in the information handling system bus target device identification field is on the access control list hosted in the port above the information handling system bus device, through the information handling system bus.

2. The method of claim 1, further comprising discarding, by the port above the information handling system bus device, each information handling system bus out of band message from the information handling system bus device, in which the information handling system bus target device identification in the information handling system bus target device identification field is not on the access control list hosted in the port above the information handling system bus device.

3. The method of claim 2, further comprising generating an error notification and/or an error status, by the port above the information handling system bus device, in response to the discarding of an information handling system bus out of band message from the information handling system bus device in which the information handling system bus target device identification in the information handling system bus target device identification field is not on the access control list hosted in the port above the information handling system bus device.

4. The method of claim 1, wherein the information handling system bus out of band messages access control list comprises an information handling system bus target device identifier of an information handling system baseboard management controller and no other information handling system bus target device identifiers.

5. The method of claim 1, wherein the information handling system bus out of band messages access control list comprises an information handling system bus target device identifier of an information handling system baseboard management controller and at least one other information handling system bus target device identifier.

6. The method of claim 1, further comprising write protecting the information handling system bus out of band message access control list.

7. The method of claim 6, wherein write protecting the information handling system bus out of band message access control list comprises creating the information handling system bus out of band message access control list in write-once registers of the port.

8. The method of claim 6, wherein write protecting the information handling system bus out of band message access control list comprises authenticating an alteration to the information handling system bus out of band message access control list, by the port, with an information handling system baseboard management controller prior to altering the information handling system bus out of band message access control list.

9. The method of claim 1, wherein creating the information handling system bus out of band message access control list further comprises:
   creating an initially empty information handling system bus out of band message access control list,
   authenticating the information handling system bus connected device; and updating the information handling system bus out of band message access control list to include an information handling system baseboard management controller.

10. The method of claim 9, wherein authenticating the information handling system bus connected device is carried out via an interface of another information handling system bus.

11. The method of claim 10, wherein the interface of another information handling system bus is a system management bus interface.

12. The method of claim 9, further comprising updating the information handling system bus out of band message access control list to include at least one other information handling system bus connected device.

13. The method of claim 1, wherein the information handling system bus is a peripheral component interconnect express compliant bus.

14. The method of claim 13, wherein the out of band message is a peripheral component interconnect express vendor defined message.

15. The method of claim 1, wherein the out of band message is a vendor defined message.

16. The method of claim 1, wherein the port above the information handling system bus device is a root port.

17. The method of claim 1, wherein the port above the information handling system bus device is a switch downstream port.

18. An information handling system bus comprising a port above an information handling system bus device, the port configured to:
host an information handling system bus out of band message access control list the access control list comprising a list of information handling system bus target device identifiers of other information handling system bus connected devices that an information handling system bus connected device is permitted to communicate with;
compare an information handling system bus target device identification field in information handling system bus out of band messages from the information handling system bus device to the information handling system bus out of band message access control list; and
route each information handling system bus out of band message from the information handling system bus device, in which the information handling system bus target device identification in the information handling system bus target device identification field is on the access control list through the information handling system bus.

19. The information handling system bus of claim 18, wherein the port is further configured to:
discard each information handling system bus out of band message from the information handling system bus device, in which the information handling system bus target device identification in the information handling system bus target device identification field is not on the access control list hosted in the port above the information handling system bus device; and
generate an error notification and/or an error status in response to the discarding of the information handling system bus out of band message from the information handling system bus device in which the information handling system bus target device identification in the information handling system bus target device identification field is not on the access control list hosted in the port above the information handling system bus device.

20. An information handling system comprising:
a bus comprising a port above an information handling system bus device, the port configured to:
host an information handling system bus out of band message access control list, the access control list comprising a list of information handling system bus target device identifiers of other information handling system bus connected devices that the information handling system bus device is permitted to communicate with;
compare an information handling system bus target device identification field in information handling system bus out of band messages from the information handling system bus device to the information handling system bus out of band message access control list; and
route each information handling system bus out of band message from the information handling system bus device, in which the information handling system bus target device identification in the information handling system bus target device identification field is on the access control list through the information handling system bus.

* * * * *